(12) United States Patent
Sun et al.

(10) Patent No.: US 9,164,499 B2
(45) Date of Patent: Oct. 20, 2015

(54) STATIC SECURITY CONSTRAINED AUTOMATIC VOLTAGE CONTROL METHOD

(71) Applicant: Tsinghua University, Beijing (CN)

(72) Inventors: Hongbin Sun, Beijing (CN); Qinglai Guo, Beijing (CN); Boming Zhang, Beijing (CN); Wenchuan Wu, Beijing (CN); Bin Wang, Beijing (CN); Mingye Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 368 days.

(21) Appl. No.: 13/914,270

(22) Filed: Jun. 10, 2013

(65) Prior Publication Data

US 2014/0046493 A1      Feb. 13, 2014

(30) Foreign Application Priority Data

Aug. 13, 2012   (CN) .......................... 2012 1 0287511

(51) Int. Cl.
G05B 15/02     (2006.01)
H02J 3/00      (2006.01)
H02J 3/06      (2006.01)

(52) U.S. Cl.
CPC . *G05B 15/02* (2013.01); *H02J 3/06* (2013.01); *G06F 2217/78* (2013.01); *H02J 2003/001* (2013.01); *H02J 2003/007* (2013.01)

(58) Field of Classification Search
CPC ....... G05B 15/02; G06F 2217/78; H02J 3/06; H02J 2003/001; H02J 2003/007
USPC ...................... 700/29, 286; 703/18
See application file for complete search history.

(56) References Cited

U.S. PATENT DOCUMENTS

2008/0109205 A1* 5/2008 Nasle ............................. 703/18
2008/0262820 A1* 10/2008 Nasle ............................. 703/18

(Continued)

FOREIGN PATENT DOCUMENTS

WO          WO 9630843 A1 * 10/1996

OTHER PUBLICATIONS

Krishnan, Venkat Kumar, "Coordinated static and dynamic reactive power planning against power system voltage stability related problems" (2007). Retrospective Theses and Dissertations. Paper 14670.*
""Static Security Constrained Automatic Voltage Control Method" in Patent Application Approval Process." Information Technology Newsweekly. NewsRX. 2014. HighBeam Research. Aug. 4, 2015 <http://www.highbeam.com>.*

(Continued)

*Primary Examiner* — Robert Fennema
*Assistant Examiner* — Jennifer L Norton
(74) *Attorney, Agent, or Firm* — David D. Brush; Westman, Champlin & Koehler, P.A.

(57) ABSTRACT

A static security constrained automatic voltage control method is provided, which includes: performing a single automatic voltage control calculation for a control snapshot of a power system in each control cycle. The single automatic voltage control calculation comprises: obtaining a single-time severe contingency sequencing table and a periodical severe contingency sequencing table from a historical severe contingency information database, and selecting severe contingencies; performing a contingency assessment for the active contingency set, and iterating between a result of the contingency assessment for the active contingency set and a solution of the optimal power flow model to obtain a single automatic voltage control instruction; and performing a contingency assessment for a contingency set, and updating the single-time severe contingency sequencing table and the periodical severe contingency sequencing table according to a comprehensive result of the contingency assessment.

12 Claims, 1 Drawing Sheet

(56) References Cited

U.S. PATENT DOCUMENTS

| | | | |
|---|---|---|---|
| 2009/0063122 A1* | 3/2009 | Nasle | 703/18 |
| 2013/0311162 A1* | 11/2013 | Radibratovic et al. | 703/18 |
| 2014/0046501 A1* | 2/2014 | Sun et al. | 700/298 |
| 2014/0136178 A1* | 5/2014 | Meagher et al. | 703/18 |
| 2014/0236316 A1* | 8/2014 | Gupta | 700/29 |
| 2015/0100295 A1* | 4/2015 | Jetcheva et al. | 703/18 |

OTHER PUBLICATIONS

English translation of the Chinese Office Action dated Feb. 11, 2014 for Chinese Patent Application No. 201210287511.7.

\* cited by examiner

STATIC SECURITY CONSTRAINED AUTOMATIC VOLTAGE CONTROL METHOD

CROSS-REFERENCE TO RELATED APPLICATION

This application claims priority to and benefits of Chinese Patent Application Serial No. 201210287511.7, filed with the State Intellectual Property Office of P. R. China on Aug. 13, 2012, the entire content of which is incorporated herein by reference.

FIELD

The present disclosure relates to a field of an operation and control of a power system, and more particularly to a static security constrained automatic voltage control method.

BACKGROUND

An automatic voltage control (AVC) system is an important means to ensure a secure, economic and high-quality running of a power grid. A principle of the AVC lies in realizing a reasonable distribution of a reactive voltage in the power grid by coordinately controlling a reactive power output of a generator, a transformer tap, and a reactive power compensation apparatus, thus increasing a voltage stability margin, reducing an active power transmission loss, and improving a voltage eligibility rate, etc. A primary means for determining a coordinated controlling instruction is to solve an optimal power flow (OPF) model, as shown in a formula (1'):

$$\min f(x_0, u_0) \quad (1')$$
$$s.t. \ g_0(x_0, u_0) = 0$$
$$\underline{u} \le u_0 \le \overline{u}$$
$$\underline{x} \le x_0 \le \overline{x}$$

where $u_0$ is a control variable vector, $x_0$ is a state variable vector, an object function $f(x_0, u_0)$ is an active power transmission loss of the power system, a constraint equation $g_0(x_0, u_0)=0$ is a power flow equation of the power system in a pre-contingency state, $\underline{u}$ is a lower limit of the control variable vector, $\overline{u}$ is an upper limit of the control variable vector, $\underline{x}$ is a lower limit of the state variable vector, and $\overline{x}$ is an upper limit of the state variable vector.

With an increasing security requirement of a power grid operation, in an automatic voltage control process, a control result needs to satisfy a static security requirement, except that a base state security of the power system needs to be constrained. A security constrained optimal power flow (SCOPF) model is thus introduced to simultaneously take into account the security and economy of the power system, so as to generate an automatic voltage control instruction meeting the static security requirement.

Steps of a typical static security constrained automatic voltage control method may be illustrated as follows.

In step 1, a contingency set $C_{All}$ scrutinized by a contingency assessment (CA) is set. The contingency assessment means that using a current result of the power flow as a base state of the power system, a result of the power flow after a contingency occurs in the power system is simulated, so as to predict whether a security risk exists in the power system and to determine whether a variable of the power system will be out of limit after a contingency occurs in the power system. A contingency is an outage of a component (such as a transmission line, a transformer, a generator, a load, a bus) of the power system and a combination thereof, which is predetermined in order to study an influence of the contingency on a secure of the power system. The contingency set $C_{All}$ is represented by:

$$C_{All} = \{\text{contingency } k | k=1, \ldots, N_C\},$$

where $N_C$ is a number of the contingencies contained in the contingency set.

In step 2, power flow equations and variable constraints in all the post-contingency states (where the contingency is in the contingency set) are added to the optimal power flow model to construct a static security constrained optimal power flow model, as shown in a formula (2'):

$$\min f(x_0, u_0) \quad (2')$$
$$s.t. \ g_0(x_0, u_0) = 0$$
$$g_k(x_k, u_0) = 0$$
$$\underline{u} \le u_0 \le \overline{u}$$
$$\underline{x} \le x_0 \le \overline{x}$$
$$\underline{x}^C \le x_k \le \overline{x}^C$$
$$k = 1, \ldots, N_C$$

where k is a series number of a power system state, k=0 represents the base state (or known as a pre-contingency state), k=1, ..., $N_C$ represents a $k^{th}$ post-contingency state; $u_0$ is a control variable vector, $x_0$ is a state variable vector of the pre-contingency state, $x_k$ is a state variable vector of the $k^{th}$ post-contingency state, $N_x$ is a number of elements contained in $x_0$ or $x_k$; a value of the control variable (such as a voltage amplitude of a generator bus) usually stays the same in the pre-contingency state and in the post-contingency states; a value of the state variable, which is usually different in the pre-contingency state and in the post-contingency states, is determined by a network structure of the power system, a parameter of an element, and the value of the control variable, such as a voltage amplitude of a load bus, a voltage amplitude of a contact bus, a reactive power output of a generator, and a voltage phase angle of each bus; an object function $f(x_0, u_0)$ is the active power transmission loss of the power system, a constraint equation $g_0(x_0, u_0)=0$ is the power flow equation of the power system in the pre-contingency state, $g_k(x_k, u_0)=0$ is a power flow equation of the power system in the $k^{th}$ post-contingency state; $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, $\underline{x}^C$ is a lower limit of the state variable vectors in the post-contingency states, and $\overline{x}^C$ is an upper limit of the state variable vectors in the post-contingency states.

In step 3, the static security constrained optimal power flow model is solved to obtain the automatic voltage control instruction.

In step 4, an automatic voltage control is performed for the power system according to the automatic voltage control instruction.

For the typical static security constrained automatic voltage control method, because a number of the contingences set in the contingency set $C_{All}$ is generally large so as to make an optimization model huge in scale, it is generally difficult to solve the optimization model in a practical conducting process of an automatic voltage control, and it is substantially impossible to solve the optimization model in a time required by an online conducting. Meanwhile, because of a strict post-contingency security constraint, it is possible to make a feasible region of the optimization model void, that is, there is no feasible solution, and thus a usable automatic voltage control instruction may not be obtained. Therefore, it is difficult for this typical static security constrained automatic voltage control method to meet a requirement of an online conducting of the automatic voltage control.

SUMMARY

Embodiments of the present disclosure seek to solve at least one of the problems existing in the prior art to at least some extent. Accordingly, a new static security constrained automatic voltage control method is provided. With the static security constrained automatic voltage control method according to embodiments of the present disclosure, a security of a power system is improved in a pre-contingency state and in post-contingency states, a solving difficulty of a static security constrained automatic voltage control is greatly reduced, and a time consuming of a calculation may meet a requirement of an online conducting of the automatic voltage control. In the case where the static security of the power system is strictly required so that there is no solution for the conventional method, a coordinated solution with a balance between the economy and the security may be given by the method of the present disclosure so as to provide the automatic voltage control instruction. The calculation is simplified, and the automatic voltage control instruction obtained is accurate, thus coordinating and optimizing the economy and security of the power system effectively.

According to embodiments of the present disclosure, a static security constrained automatic voltage control method is provided. Based on an analysis of a severity and a time distribution characteristic of all historical severe contingencies, a severe contingency set is selected, then an iteration is performed between a result of a contingency assessment and a solution of an optimal power flow model to obtain an automatic voltage control instruction; and an automatic voltage control is conducted according to the automatic voltage control instruction.

The static security constrained automatic voltage control method comprises: performing a single automatic voltage control calculation for a control snapshot of a power system at a beginning of a control cycle in each control cycle according to a requirement of a power grid operation for the automatic voltage control when on-line conducting at a power grid control center, in which the single automatic voltage control calculation comprises steps of:

(1') obtaining a single-time severe contingency sequencing table (Single-time SCST) and a periodical severe contingency sequencing table (Periodical SCST) from a historical severe contingency information database, and selecting severe contingencies from a contingency set $C_{All}$ according to the Single-time SCST and the Periodical SCST to compose an active contingency set $C_{Active}$ of the single automatic voltage control calculation;

(2') solving a trial solution of an optimal power flow model (which is called a trial OPF solution), using the trial OPF solution as a base state of the power system, and performing an iteration between a first result of the contingency assessment for the active contingency set $C_{Active}$ (which is called an active CA result) and a solution of the optimal power flow model to solve and obtain a single automatic voltage instruction; and (3') performing a contingency assessment for the contingency set $C_{All}$ using the trial OPF solution as the base state of the power system to obtain a second result of the contingency assessment (which is called a comprehensive CA result) and updating the Single-time SCST and the Periodical SCST according to the comprehensive CA result, in which the updated severe contingency sequencing table is to be used in a next single automatic voltage control calculation.

In one embodiment, the single automatic voltage control calculation comprises steps of:

(1) obtaining by a calculating unit a single-time severe contingency sequencing table and a periodical severe contingency sequencing table from a historical severe contingency information database stored in a non-transitory computer-readable medium, and selecting by the calculating unit the severe contingencies from a contingency set $C_{All}$ according to the single-time severe contingency sequencing table and the periodical severe contingency sequencing table to compose an active contingency set $C_{Active}$ of the single automatic voltage control calculation stored in the computer-readable medium;

(2) solving by the calculating unit a trial solution of an optimal power flow model, using by the calculating unit the trial solution of the optimal power flow model as a base state of the power system, and performing by the calculating unit an iteration between a first result of the contingency assessment for the active contingency set $C_{Active}$ and the trial solution of the optimal power flow model to solve and obtain a single automatic voltage instruction stored in the computer-readable medium; and (3) performing by the calculating unit a contingency assessment for the contingency set $C_{All}$ using the trial solution of the optimal power flow model as the base state of the power system to obtain a second result of the contingency assessment, and updating by the calculating unit the single-time severe contingency sequencing table and the periodical severe contingency sequencing table according to the second result of the contingency assessment, in which the updated severe contingency sequencing table is to be used in a next single automatic voltage control calculation.

Compared with a conventional static security constrained automatic voltage control method, the static security constrained automatic voltage control method according to embodiments of the present disclosure at least has following advantages.

1. The method for selecting severe contingencies based on history information may quickly and effectively identify and select a contingency which causes a maximum violation to appear in a security monitor variable of a current control snapshot. Therefore, a number of the contingencies needing to be calculated in the contingency assessment is greatly reduced, thus increasing an online calculation speed.

2. By iterating between the result of the contingency assessment and the solution of the optimal power flow model to obtain the automatic voltage control instruction, the solving difficulty of the static security constrained automatic voltage control is greatly reduced, and the time consuming of the calculation may meet the requirement of the online conducting of the automatic voltage control.

3. In the case where the static security of the power system is strictly required so that there is no solution for the conventional method, a coordinated solution with a balance between the economy and the security may be given by the method of the present disclosure so as to provide the automatic voltage control instruction.

4. The calculation is simplified, and the automatic voltage control instruction obtained is accurate. Both an active power transmission loss of the power system and a maximum violation of the voltage amplitude in post-contingency states are significantly reduced after the automatic voltage control instruction is conducted, which enables the economy and security of the power system significantly improved.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
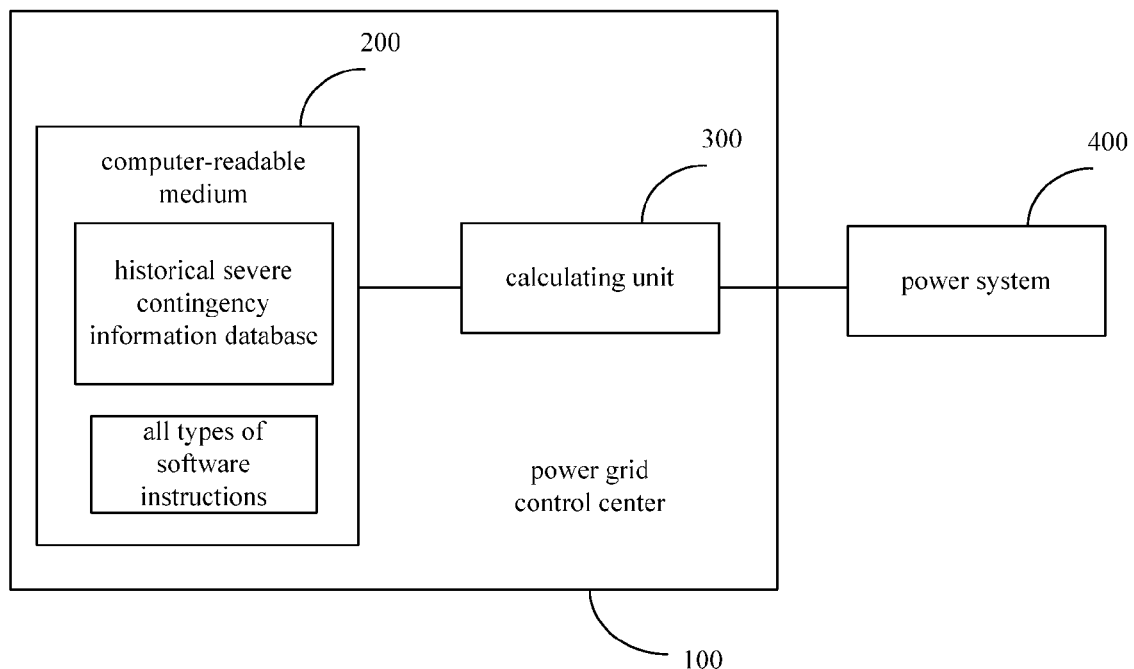
FIG. 1 is a block diagram of a power grid control center for automatically controlling a voltage of a power system by using a static security constrained automatic voltage control method according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance.

According to an embodiment of the present disclosure, a static security constrained automatic voltage control method is provided. When on-line conducting at a power grid control center, according to a requirement of a power grid operation for an automatic voltage control, using a certain time interval as a control cycle, a single automatic voltage control calculation is performed in each control cycle using the method according to embodiments of the present disclosure. The single automatic voltage control calculation is performed for a snapshot of a power system at a beginning of the control cycle. The snapshot (or known as a power flow snapshot) refers to a set of information, such as a network structure of the power system, a parameter of an element, and a result of a power flow at a moment T. The snapshot at the beginning of the control cycle is thus called a control snapshot.

FIG. 1 is a block diagram of the power grid control center for automatically controlling a voltage of the power system by using the static security constrained automatic voltage control method according to an embodiment of the present disclosure. As shown in FIG. 1, the power grid control center 100 comprises a non-transitory computer-readable medium 200 and a calculating unit 300 with electrical communication with each other. The computer-readable medium 200 is used for storing a historical severe contingency information database and all types of software instructions. The calculating unit 300 is electrically connected to the power system 400 for automatically controlling a voltage thereof.

The various steps performed by the power grid control center 100, such as by the calculating unit 300, can be implemented, for example: by the execution of a set of computer instructions executed by a reprogrammable computing machine such as a PC type apparatus, a DSP (a digital signal processor), a micro-controller or other data processor; or else by a dedicated hardware machine or component such as an FPGA (Field Programmable Gate Array), an ASIC (Application-Specific Integrated Circuit) or any other hardware module. In case the algorithm defining the method is implemented in a reprogrammable computing machine, the corresponding program (i.e. the set of instructions) can be stored in a non-transitory computer-readable medium (such as medium 200 or another medium), which may be detachable (for example a memory card, a CD-ROM or a DVD-ROM) or non-detachable, such a embedded RAM or an addressable memory available on a network.

The single automatic voltage control calculation comprises following steps.

In step (1), a Single-time SCST and a Periodical SCST are obtained by the calculating unit 300 from the historical severe contingency information database which is stored in the computer-readable medium 200, and severe contingencies are selected from a contingency set $C_{All}$ according to the Single-time SCST and the Periodical SCST to compose an active contingency set $C_{Active}$ of the single automatic voltage control calculation which is stored in the computer-readable medium 200.

In step (2), a trial OPF solution is solved by the calculating unit 300 firstly; then using the trial solution as a base state of the power system, an iteration between an active CA result for the contingency set $C_{Active}$ and a solution of the optimal power flow model is performed by the calculating unit 300 to solve and obtain a single automatic voltage control instruction which is stored in the computer-readable medium 200.

In step (3), a contingency assessment is performed by the calculating unit 300 for the contingency set $C_{All}$ using the trial OPF solution as the base state of the power system to obtain a comprehensive CA result, and the severe contingency sequencing table is updated by the calculating unit 300 according to the comprehensive CA result, in which the updated severe contingency sequencing table is to be used in a next single automatic voltage control calculation.

In one embodiment, step (1) further comprises following steps.

In step (1-1), a Single-time SCST identified by a time mark T' of a control snapshot of a previous single automatic voltage control calculation is obtained by the calculating unit 300 from the historical severe contingency information database in a sequence of severity.

In step (1-2), a Periodical SCST in a period of time p, in which a time mark T of a current control snapshot is contained, is obtained by the calculating unit 300 from the historical severe contingency information database in a sequence of severity.

In step (1-3), $N_{Active}$ severest contingencies are selected by the calculating unit 300 from the Single-time SCST and the Periodical SCST in a sequence of severity from high to low to compose the active contingency set $C_{Active}$ of the single automatic voltage control calculation, where $N_{Active}$ is a predetermined number of the contingencies contained in the active contingency set $C_{Active}$ and is calculated by rounding upward to a nearest integer of an average of a number of the severe contingencies contained in the Single-time SCSTs obtained from all previous automatic voltage control calculations.

In one embodiment, step (2) further comprises following steps.

In step (2-1), the optimal power flow model (1) is solved by the calculating unit 300 to obtain a trial OPF solution $(u_0^{(0)}, x_0^{(0)})$ of the power system $$\min f(x_0, u_0) \quad (1)$$
$$s.t. \ g_0(x_0, u_0) = 0$$
$$\underline{u}^{(0)} \leq u_0 \leq \overline{u}^{(0)}$$
$$\underline{x}^{(0)} \leq x_0 \leq \overline{x}^{(0)}$$

where $u_0$ is a control variable vector, $x_0$ is a state variable vector, an object function $f(x_0,u_0)$ is an active power transmission loss of the power system, a constraint equation $g_0(x_0, u_0)=0$ is a power flow equation of the power system in the pre-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre contingency state, $\underline{u}^{(0)}=\underline{u}$, $\overline{u}^{(0)}=\overline{u}$, $\underline{x}^{(0)}=\underline{x}$, and $\overline{x}^{(0)}=\overline{x}$.

In step (2-2), the contingency assessment is performed by the calculating unit 300 for the active contingency set $C_{Active}$ using the trial OPF solution $(u_0^{(0)}, x_0^{(0)})$ of the power system as the base state of the power system to obtain the active CA result, and the iteration is performed by the calculating unit 300 between the active CA result and a solution of the optimal power flow model to solve and obtain the single automatic voltage control instruction.

In step (2-3), an automatic voltage control is performed by the calculating unit 300 for the power system in the control cycle according to the single automatic voltage control instruction.

In one embodiment, step (3) further comprises following steps.

In step (3-1), a contingency assessment is performed by the calculating unit 300 for the contingency set $C_{All}$ using the trial OPF solution $(u_0^{(0)}, x_0^{(0)})$ as the base state of the power system, and if an $i^{th}$ variable $x_i$ in a state variable vector x is a security monitor variable (the security monitor variable refers to a variable monitored during the operation of the power system, and for results of the contingency assessment, including the active CA result and the comprehensive CA result, only the violations of these variables are taken into account), a high violation $\overline{\delta}_{i,k}$ and a low violation $\underline{\delta}_{i,k}$ of an $i^{th}$ element $x_{i,k}$ in a state variable vector $x_k$ in a post-contingency state of a contingency k are calculated by the calculating unit 300 by a formula (2):

$$\overline{\delta}_{i,k} = \begin{cases} x_{i,k} - \overline{x}_i^C & (x_{i,k} > \overline{x}_i^C) \\ 0 & (x_{i,k} \leq \overline{x}_i^C) \end{cases} \quad (2)$$

$$\underline{\delta}_{i,k} = \begin{cases} \underline{x}_i^C - x_{i,k} & (x_{i,k} < \underline{x}_i^C) \\ 0 & (x_{i,k} \geq \underline{x}_i^C) \end{cases}$$

where $k=1, \ldots, N_c$, $i=1, \ldots, N_x$, and $x_i$ is a security monitor variable.

In step (3-2), a contingency, which causes a maximum high violation or a maximum low violation to appear in any security monitor variable, is selected by the calculating unit 300 to compose a severe contingency set $C_{Severity}$:

$$C_{Severity} = \left\{ \text{a contingency } m \mid \exists i, 1 \leq i \leq N_x, i \in N_+, \right.$$
$$\left. x_i \text{ is a security monitor variable s.t. } \overline{\delta}_{i,m} = \max_k \overline{\delta}_{i,k} \text{ or } \underline{\delta}_{i,m} = \max_k \underline{\delta}_{i,k} \right\}$$

In step (3-3), if the maximum high violations appear in $n_{k,U}$ security monitor variables and the maximum low violations appear in $n_{k,L}$ security monitor variables in the post-contingency state of contingency k, a severity index of the contingency k is recorded by the calculating unit 300 as $n_k=n_{k,L}+n_{k,U}$. The contingencies in the severe contingency set $C_{Severity}$ are sequenced by the calculating unit 300 according to the severity indexes of the contingencies, and the contingencies in $C_{Severity}$ are saved by the calculating unit 300 into the Single-time SCST with a time mark T in the historical severe contingency information database.

In step (3-4), the Periodical SCST in the historical severe contingency information database in the period of time p in which the time mark T of the control snapshot of the single automatic voltage control calculation is contained is updated by the calculating unit 300.

In one embodiment, step (3-4) may further comprise following steps.

In step (3-4-1), one day is divided into a plurality of fixed periods of time (for example, if one hour is used as one period of time, there are 24 periods of time in the one day; or if half an hour is used as the one period of time, there are 48 periods of time in the one day), the Periodical SCST in each period of time is saved in the historical severe contingency information database. The severity index $n_{k,p}$ of the contingency k in the period of time p is defined as times for which the contingency k is the severe contingency in the period of time p, that is, for $\forall T \in p$, $n_{k,p}$=times of contingency $k \in C_{Severity}$. The severity index of each contingency in the Periodical SCST of the period of time p, in which the time mark T of a current control section is contained, is picked by the calculating unit 300, and for $\forall$ contingency $k \in C_{Severity}$, the severity index is updated by the calculating unit 300 as $n_{k,p}'=n_{k,p}+1$.

In step (3-4-2), the severe contingencies are sequenced by the calculating unit 300 according to the updated severity index so as to update the Periodical SCST of the period of time p, and the updated Periodical SCST is saved by the calculating unit 300 in the historical severe contingency information database.

In one embodiment, step (2-2) may further comprise following steps.

In step (2-2-1), t=0 is assumed, where t is an iterative sequence number, and $t \in N_+$.

In step (2-2-2), a contingency assessment is performed by the calculating unit 300 for the active contingency set $C_{Active}$ using the solution $(u_0^{(t)}, x_0^{(t)})$ as the base state of the power system to obtain the active CA result; and if the security monitor variables in the active CA result do not have a violation or have a violation less than a maximum violation allowable by an operation of the power system, step (2-2-7) is executed, or else, step (2-2-3) is executed.

In step (2-2-3), security limits of variables $\underline{u}^{(t+1)}$, $\overline{u}^{(t+1)}$, $\underline{x}^{(t+1)}$, $\overline{x}^{(t+1)}$ are adjusted by the calculating unit 300 according to the active CA result.

In step (2-2-4), t=t+1 is assumed.

In step (2-2-5), an optimal power flow model (3) established by adopting the adjusted security limits is solved by the calculating unit 300:

$$\min f(x_0, u_0) \quad (3)$$

$$s.t. \quad g_0(x_0, u_0) = 0$$

$$\underline{u}^{(t)} \leq u_0 \leq \overline{u}^{(t)}$$

$$\underline{x}^{(t)} \leq x_0 \leq \overline{x}^{(t)}.$$

In step (2-2-6), when t>0, if $|u_0^{(t)}-u_0^{(t-1)}|\leq tol$ and $|x_0^{(t)}-x_0^{(t-1)}|\leq tol$, (where tol is a convergence criterion, and tol may be within a range from $10^{-4}$ to $10^{-2}$ according to a scale of the power system to be controlled), step (2-2-7) is executed, or else, step (2-2-2) is executed.

In step (2-2-7), the solution $(u_0^{(t)},x_0^{(t)})$ of the automatic voltage control calculation in the control cycle is obtained by the calculating unit 300, and the single automatic voltage control instruction in the control cycle is output.

It should be noted that, since only a violation of a voltage amplitude of a bus is generally taken into account during the automatic voltage control, in this embodiment, an adjusting formula of the security limit is given by merely taking the voltage amplitude of the bus as an example. If the security limit of another type of variable needs to be adjusted, a calculating formula thereof may be similarly and reasonably given according to a physical characteristic of the variable.

In one embodiment, step (2-2-3) may further comprise following steps.

In step (2-2-31), if a variable $x_i$ is a security monitor variable, a high violation $\overline{\delta}_{i,k}$ and a low violation $\underline{\delta}_{i,k}$ of the variable $x_i$ in a post-contingency state of a contingency k in a $t^{th}$ time iteration are calculated by the calculating unit 300 by a formula (4):

$$\overline{\delta}_{i,k}^{(t)} = \begin{cases} x_{i,k}^{(t)} - \overline{x}_i^C & (x_{i,k}^{(t)} > \overline{x}_i^C) \\ 0 & (x_{i,k}^{(t)} \leq \overline{x}_i^C) \end{cases} \quad (4)$$

$$\underline{\delta}_{i,k}^{(t)} = \begin{cases} \underline{x}_i^C - x_{i,k}^{(t)} & (x_{i,k}^{(t)} < \underline{x}_i^C) \\ 0 & (x_{i,k}^{(t)} \geq \underline{x}_i^C) \end{cases}$$

where k=1, ... $N_c$, i=1, ..., $N_x$, the contingency k∈$C_{Active}$, and $x_i$ is a security monitor variable.

In step (2-2-32), it is defined that $$\overline{\delta}_i^{(t)} = \max_k \{\overline{\delta}_{i,k}^{(t)}\} \quad (5)$$

$$\underline{\delta}_i^{(t)} = \max_k \{\underline{\delta}_{i,k}^{(t)}\}.$$

In step (2-2-33), a lower limit $\underline{x}_i^{(t+1)}$ and an upper limit $\overline{x}_i^{(t+1)}$ of the security monitor variable $x_i$ used in a $(t+1)^{th}$ time iteration are calculated by the calculating unit 300 by a formula (6):

$$\underline{x}_i^{(t+1)} = \min\{\underline{x}_i^{(t)} + k_{min} \cdot \overline{\delta}_i^{(t)}, x_{i,base}, \overline{x}_i^{(t)} - \epsilon\}$$

$$\overline{x}_i^{(t+1)} = \max\{\overline{x}_i^{(t)} - k_{max} \cdot \underline{\delta}_i^{(t)}, x_{i,base}, \underline{x}_i^{(t+1)} + \epsilon\} \quad (6)$$

where $k_{min}$ is an adjusting coefficient of a lower limit of a variable, $k_{max}$ is an adjusting coefficient of an upper limit of the variable, $x_{i,base}$ is a value of the variable $x_i$ in a control snapshot before the automatic voltage control calculation, and $\epsilon$ is a minimum band width between the upper limit and the lower limit of the variable. Specifically, in this embodiment, $k_{min}$ may be an adjusting coefficient of a lower limit of a bus voltage amplitude, $k_{max}$ may be an adjusting coefficient of an upper limit of the bus voltage amplitude, $x_{i,base}$ may be a value of the bus voltage amplitude $x_i$ in the control snapshot before the automatic voltage control calculation, and $\epsilon$ is a minimum band width between the upper limit and the lower limit of bus voltage amplitude. $k_{min}$ and $k_{max}$ are generally within a range from 0.8 to 1.2, and $\epsilon$ is generally greater than 0.01 p.u.

In one embodiment, step (2-2-5) may further comprise following steps.

In step (2-2-51), the optimal power flow model (3) is solved by the calculating unit 300, and if there is a solution, step (2-2-53) is executed, or else, step (2-2-52) is executed.

In step (2-2-52), $k_{min}$ and $k_{max}$ are reduced (by 0.02, 0.05 or 0.1 each time, for example), the lower limit $\underline{x}_i^{(t+1)}$ and the upper limit $\overline{x}_i^{(t+1)}$ of the security monitor variable $x_i$ are recalculated by the formula (6), and then step (2-2-51) is executed.

In step (2-2-53), the solution $(u_0^{(t)},x_0^{(t)})$ is obtained by the calculating unit 300.

The method according to the present disclosure will be further illustrated by means of a specific embodiment below.

Figure 2:
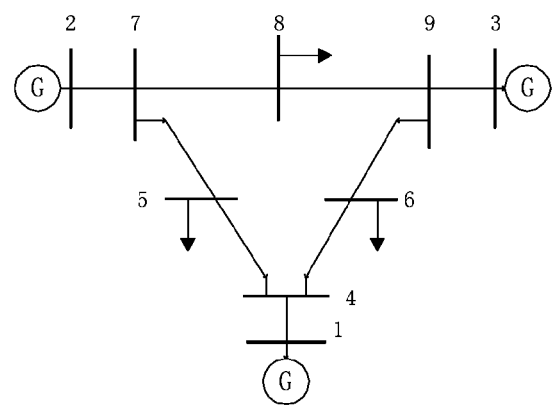
FIG. 2 is a diagram of a power system model of an IEEE 9-bus power system to which a static security constrained automatic voltage control method according to an embodiment of the present disclosure is applied.

In this embodiment, the static security constrained automatic voltage control method is applied to an IEEE 9-bus power system. A system model of the IEEE 9-bus power system is shown in FIG. 2. The power system comprises 3 generators G and 3 loads D connected via 9 transmission lines. The power system also comprises 9 buses, which are marked as 1-9 in FIG. 2. In this embodiment, the automatic voltage control is performed for the IEEE 9-bus power system, and thus automatic voltage control instructions are supplied to control the voltage amplitudes of the 9 buses.

The contingency set scrutinized by the contingency assessment of the power system according to the embodiment of the present disclosure is shown in Table 1, in which all contingencies constitute the contingency set $C_{All}$. All voltage amplitudes of the buses are set as security monitor variables. For any state, including the pre-contingency state and the post-contingency state, an upper limit of the voltage amplitude of any bus is set as $\overline{V}=\overline{V}^C=1.13$, and a lower limit of any bus is set as $\underline{V}=\underline{V}^C=0.95$.

TABLE 1

Setting of contingency set $C_{All}$

| contingency No. | contingency |
|---|---|
| contingency 1 | an outage of a transmission line between bus 7 and bus 8 |
| contingency 2 | an outage of a transmission line between bus 8 and bus 9 |
| contingency 3 | an outage of a transmission line between bus 5 and bus 7 |
| contingency 4 | an outage of a transmission line between bus 6 and bus 9 |
| contingency 5 | an outage of a transmission line between bus 4 and bus 5 |
| contingency 6 | an outage of a transmission line between bus 4 and bus 6 |

By using one hour as one period of time, one day is divided into 24 periods of time. According to a variation law of the load of the power system, one power flow snapshot is generated per hour from 8:30 in a first day to 7:30 in a $51^{th}$ day. Therefore, there are data in 50 days generated in total for simulating the running of the power system. A single automatic voltage control calculation is performed for each power flow snapshot, so that the Periodical SCST in each period of time is obtained as shown in Table 2 after a simulation of the running of the power system and the automatic voltage control.

TABLE 2

Periodical SCST in each period of time

| 0:00-1:00 | | 1:00-2:00 | | 2:00-3:00 | | 3:00-4:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| — | | — | | — | | — | |

| 4:00-5:00 | | 5:00-6:00 | | 6:00-7:00 | | 7:00-8:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| contingency 5 | 3 | contingency 5 | 18 | contingency 1 | 48 | contingency 1 | 50 |
| | | | | contingency 5 | 38 | contingency 5 | 6 |

| 8:00-9:00 | | 9:00-10:00 | | 10:00-11:00 | | 11:00-12:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| contingency 1 | 50 | contingency 5 | 50 | contingency 5 | 50 | contingency 1 | 50 |
| preconceived contingency 5 | 50 | contingency 2 | 44 | contingency 1 | 40 | contingency 5 | 41 |
| preconceived contingency 2 | 2 | contingency 1 | 21 | contingency 2 | 38 | | |

| 12:00-13:00 | | 13:00-14:00 | | 14:00-15:00 | | 15:00-16:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| contingency 1 | 50 | contingency 1 | 50 | contingency 5 | 50 | contingency 5 | 50 |
| contingency 5 | 7 | contingency 5 | 50 | contingency 2 | 50 | contingency 2 | 50 |
| | | preconceived contingency 2 | 1 | | | | |

| 16:00-17:00 | | 17:00-18:00 | | 18:00-19:00 | | 19:00-20:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| contingency 5 | 50 | contingency 5 | 50 | contingency 1 | 50 | contingency 1 | 50 |
| contingency 2 | 50 | contingency 1 | 37 | contingency 5 | 39 | contingency 5 | 10 |
| | | preconceived contingency 2 | 28 | | | | |

| 20:00-21:00 | | 21:00-22:00 | | 22:00-23:00 | | 23:00-0:00 | |
|---|---|---|---|---|---|---|---|
| severe contingency | $n_{k,p}$ | severe contingency | $n_{k,p}$ | severe contingency | $n_{k,p}$ | severe contingency | $n_{k,p}$ |
| contingency 5 | 48 | contingency 5 | 28 | — | | — | |

The contingency assessment is perform for the contingency set $C_{All}$ using the trial OPF solution of the last snapshot simulated above (i.e., a snapshot at 7:30 in the $51^{th}$ day) as the base state of the power system. The comprehensive CA result is that, the voltage amplitude of the bus 7 $V_{7,1}$=1.1314 is out of the security upper limit by a high violation $\delta_{V_{7,1}}$=0.0014 in the post-contingency state of the "contingency 1", while the voltage amplitude of any other bus is not out of limit in the post-contingency state of any other contingency. Therefore, for this control snapshot, the "contingency 1" causes a maximum violation to appear in the voltage amplitude of the bus 7, and thus contingency 1 is the severe contingency, that is, $C_{Severity}$={contingency 1}. A Single-time SCST identified by a time mark "51-7:30" of a current control snapshot is shown in Table 3.

TABLE 3

Single-time SCST identified by time mark "51-7:30"
51-7:30

| severe contingency | $n_k$ |
|---|---|
| contingency 1 | 1 |

A simulation of a next power flow snapshot is continued. A time mark of this snapshot (i.e., the control snapshot) is "51-8:30", and a voltage amplitude of each bus in this snapshot before an automatic voltage control calculation is shown as follows:

| $V_{1,base}$ | $V_{2,base}$ | $V_{3,base}$ | $V_{4,base}$ | $V_{5,base}$ | $V_{6,base}$ | $V_{7,base}$ | $V_{8,base}$ | $V_{9,base}$ |
|---|---|---|---|---|---|---|---|---|
| 1.1178 | 1.1141 | 1.1071 | 1.1085 | 1.0809 | 1.0960 | 1.1130 | 1.1010 | 1.1155 |

The active power transmission loss of this snapshot is 3.1185. The contingency assessment is perform using the current snapshot as the base state to obtain a result that the voltage amplitude of the bus 5 is out of the lower limit by a low violation of 0.0548 in the post-contingency state of the "contingency 5". Therefore, for this control snapshot, the "contingency 5" causes a maximum violation to appear in the voltage amplitude of the bus 5.

The automatic voltage control calculation for this control snapshot is performed as follows.

In step 1), the Single-time SCST and the Periodical SCST are obtained from the historical severe contingency information database, and severe contingencies are selected from the contingency set $C_{All}$ according to the Single-time SCST and the Periodical SCST to compose the active contingency set $C_{Active}$ of the single automatic voltage control calculation.

The Single-time SCST identified by the time mark "51-7:30" of the control snapshot of the previous single automatic voltage control calculation (i.e., Table 3, in which the severe contingency is "contingency 1") is obtained from the historical severe contingency information database in a sequence of severity. Then, the Periodical SCST in a period of time 8:00-9:00, in which the time mark "51-8:30" of the current control snapshot is contained, is obtained from the historical severe contingency information database in a sequence of severity. It may be known from Table 2 that the Periodical SCST contains "contingency 1", "contingency 5" and "contingency 2". An average of 1.164 of the severe contingencies contained in the Singe-time SCSTs is obtained from automatic voltage control calculations for each control snapshot in previous 50 days. Therefore, $N_{Active}$=2 severest contingencies are selected to compose the active contingency set $C_{Active}$ of the single automatic voltage control calculation. It may be known from the severe contingencies mentioned above that, two most severe contingencies are "contingency 1" and "contingency 5". Thus, the active contingency set $C_{Active}$ of the single automatic voltage control calculation is $C_{Active}$={contingency 1, contingency 5}.

In step 2), the optimal power flow model (1) is solved to obtain the trial OPF solution $(u_0^{(0)}, x_0^{(0)})$ of the power system.

For a purpose of optimizing the active power transmission loss of the power system, the constraint equation $g_0(x_0, u_0)=0$ is the power flow equation of the power system in the pre-contingency state, and only a constraint of the voltage amplitude of each bus is taken into account in variable constraints $\underline{u}^{(0)} \leq u_0 \leq \overline{u}^{(0)}$ and $\underline{x}^{(0)} \leq x_0 \leq \overline{x}^{(0)}$. The optimal power flow model (1) is solved to obtain the trial OPF solution $(u_0^{(0)}, x_0^{(0)})$ of the power system. A result of the voltage amplitude of each bus is shown as follows.

| $V_1^{(0)}$ | $V_2^{(0)}$ | $V_3^{(0)}$ | $V_4^{(0)}$ | $V_5^{(0)}$ | $V_6^{(0)}$ | $V_7^{(0)}$ | $V_8^{(0)}$ | $V_9^{(0)}$ |
|---|---|---|---|---|---|---|---|---|
| 1.1300 | 1.1300 | 1.1206 | 1.1226 | 1.0965 | 1.1110 | 1.1288 | 1.1168 | 1.1300 |

In step 3), the contingency assessment is performed for the active contingency set $C_{Active}$ using the trial OPF solution $(u_0^{(0)}, x_0^{(0)})$ of the power system as the base state of the power system to obtain the active CA result, and the iteration is performed between the active CA result and the solution of the optimal power flow model to solve and obtain the single automatic voltage control instruction.

Making t=0, the contingency assessment is performed for the active contingency set $C_{Active}$ using the solution $(u_0^{(0)}, x_0^{(0)})$ as the base state of the power system to obtain the active CA result. It may be known from the active CA result that there are two violations of the voltage amplitude in post-contingency states: a voltage amplitude $V_{5,5}^{(0)}$=0.9213 of the bus 5 in a post-contingency state of the "contingency 5" and a voltage amplitude $V_{7,1}^{(0)}$=1.1311 of the bus 7 in a post-contingency state of the "contingency 1". Since the security monitor variables in the active CA result have violations, security limits of variables should be adjusted according to the active CA result. It may be obtained from the formula (4) that an low violation of the voltage amplitude of the bus 5 in the post-contingency state of the "contingency 5" is $\underline{\delta}_{V_5,5}^{(0)} = \underline{V}^C - V_{5,5}^{(0)} = 0.0287$, a high violation of the voltage amplitude of the bus 7 in the post-contingency state of the "contingency 1" is $\overline{\delta}_{V_7,1}^{(0)} = V_{7,1}^{(0)} - \overline{V}^C = 0.0011$, and the voltage amplitude of any other bus does not have an violation. Furthermore, it may be derived from the formula (5) that $$\underline{\delta}_{V_5}^{(0)} = \max_k \{\underline{\delta}_{V_5,k}^{(0)}\} = 0.0287 \text{ and } \overline{\delta}_{V_7}^{(0)} = \max_k \{\overline{\delta}_{V_7,k}^{(0)}\} = 0.0011,$$

and thus the maximum violation of any other security monitor variable is 0.

Making $k_{min}$=1.2, $k_{max}$=1.2, $\epsilon$=0.01, security limits may be adjusted by the formula (6):

$$\underline{V}_5^{(1)} = \min\{\underline{V}_5^{(0)} + k_{min} \cdot \underline{\delta}_{V_5}^{(0)}, V_{5,base}, \overline{V}_5^{(0)} - \epsilon\}$$
$$= \min\{0.95 + 1.2 \cdot 0.0287, 1.0809, 1.13 - 0.01\} = 0.9844$$

$$\overline{V}_7^{(1)} = \max\{\overline{V}_7^{(0)} - k_{max} \cdot \overline{\delta}_{V_7,1}^{(0)}, V_{7,base}, \underline{V}_7^{(1)} + \epsilon\}$$
$$= \max\{1.13 - 1.2 \cdot 0.0011, 1.1288, 0.95 + 0.01\} = 1.1287.$$

Making t=1, the optimal power flow model (3) is solved to obtain a solution $(u_0^{(1)}, x_0^{(1)})$ using the adjusted security limits A result of the voltage amplitude of each bus is shown as follows.

| $V_1^{(1)}$ | $V_2^{(1)}$ | $V_3^{(1)}$ | $V_4^{(1)}$ | $V_5^{(1)}$ | $V_6^{(1)}$ | $V_7^{(1)}$ | $V_8^{(1)}$ | $V_9^{(1)}$ |
|---|---|---|---|---|---|---|---|---|
| 1.1300 | 1.1298 | 1.1206 | 1.1226 | 1.0964 | 1.1109 | 1.1287 | 1.1167 | 1.1300 |

Now since t>0, a deviation between a solution of the optimal power flow model in this time of iteration and a solution of the optimal power flow model in a previous time of iteration should be judged. In this embodiment, the convergence criterion is set to tol=$10^{-4}$. Since the deviation between the two solutions is greater than the convergence criterion, a calculation will continue. The contingency assessment is performed for the active contingency set $C_{Active}$ using the solution $(u_0^{(1)}, x_0^{(1)})$ as the base state of the power system to obtain an active CA result. It may be known from the active CA result that a voltage amplitude $V_{5,5}^{(1)}$=0.9211 of the bus 5 in the post-contingency state of the "contingency 5" is out of a lower limit by $\underline{\delta}_{V_5,5}^{(1)} = \underline{V}^C - V_{5,5}^{(1)} = 0.0289$, a voltage amplitude $V_{7,1}^{(1)} = 1.1309$ of the bus 7 in the post-contingency state of the "contingency 1" is out of an upper limit by $\overline{\delta}_{V_7,1}^{(1)} = V_{7,1}^{(1)} - \overline{V}^C = 0.0009$, and the voltage amplitude of any other bus does not have a violation. Therefore, it may be obtained that $\underline{\delta}_{V_5}^{(1)} = 0.0289$ and $\overline{\delta}_{V_7}^{(1)} = 0.0009$, and security limits may be adjusted as follows.

$\underline{V}_5^{(2)} = \min\{\underline{V}_5^{(1)} + k_{min} \cdot \underline{\delta}_{V_5}^{(1)}, V_{5,base}, \overline{V}_5^{(1)} - \epsilon\} = 1.0191$ $\overline{V}_7^{(2)} = \max\{\overline{V}_7^{(1)} - k_{max} \cdot \overline{\delta}_{V_7,1}^{(1)}, V_{7,base}, \underline{V}_7^{(2)} + \epsilon\} = 1.1276$ Making t=2, the optimal power flow model (3) is solved to obtain a solution $(u_0^{(2)}, x_0^{(2)})$ using the adjusted security limits A result of the voltage amplitude of each bus is shown as follows.

| $V_1^{(2)}$ | $V_2^{(2)}$ | $V_3^{(2)}$ | $V_4^{(2)}$ | $V_5^{(2)}$ | $V_6^{(2)}$ | $V_7^{(2)}$ | $V_8^{(2)}$ | $V_9^{(2)}$ |
|---|---|---|---|---|---|---|---|---|
| 1.1300 | 1.1281 | 1.1210 | 1.1224 | 1.0959 | 1.1108 | 1.1276 | 1.1160 | 1.1300 |

It may be known that, a deviation between a solution of the optimal power flow model in this time of iteration and a solution of the optimal power flow model in a previous time of iteration is greater than the convergence criterion, so a calculation will continue. The contingency assessment is performed for the active contingency set $C_{Active}$ using the solution $(u_0^{(2)}, x_0^{(2)})$ as the base state of the power system to obtain an active CA result. It may be known from the active CA result that a voltage amplitude $V_{5,5}^{(2)} = 0.9191$ of the bus 5 in the post-contingency state of the "contingency 5" is out of a lower limit by $\underline{\delta}_{V_5,5}^{(2)} = \underline{V}^C - V_{5,5}^{(2)} = 0.0309$, and the voltage amplitude of any other bus does not have a violation. Therefore, it may be obtained that $\underline{\delta}_{V_5}^{(2)} = 0.0309$, and the security limit may be adjusted as follows.

$\underline{V}_5^{(2)} = \min\{\underline{V}_5^{(1)} + k_{min} \cdot \underline{\delta}_{V_5}^{(1)}, V_{5,base}, \overline{V}_5^{(1)} - \epsilon\} = 1.0191$ Making t=3, the optimal power flow model (3) is solved to obtain a solution $(u_0^{(3)}, x_0^{(3)})$ using the adjusted security limits A result of the voltage amplitude of each bus is shown as follows.

| $V_1^{(3)}$ | $V_2^{(3)}$ | $V_3^{(3)}$ | $V_4^{(3)}$ | $V_5^{(3)}$ | $V_6^{(3)}$ | $V_7^{(3)}$ | $V_8^{(3)}$ | $V_9^{(3)}$ |
|---|---|---|---|---|---|---|---|---|
| 1.1300 | 1.1281 | 1.1210 | 1.1224 | 1.0959 | 1.1108 | 1.1276 | 1.1160 | 1.1300 |

It may be known that, a deviation between a solution of the optimal power flow model in this time of iteration and a solution of the optimal power flow model in a previous time of iteration is less than the convergence criterion, so the current solution $(u_0^{(3)}, x_0^{(3)})$ is a solution of the single automatic voltage control. A current active power transmission loss of the power system is 3.0327. The voltage amplitude of each bus in the current solution is the single automatic voltage control instruction.

In step 4), an automatic voltage control is performed for the power system in the control cycle according to the single automatic voltage control instruction.

In step 5), the contingency assessment is performed for the contingency set $C_{All}$ using the trial OPF solution $(u_0^{(0)}, x_0^{(0)})$ as the base state of the power system to obtain the comprehensive CA result, and the severe contingency sequencing table is updated according to the comprehensive CA result, in which the updated severe contingency sequencing table is to be used in a next single automatic voltage control calculation.

The contingency assessment is performed for the contingency set $C_{All}$ using the trial OPF solution $(u_0^{(0)}, x_0^{(0)})$ of the optimal power flow model as the base state of the power system to obtain a comprehensive CA result. It may be known from the comprehensive CA result that a voltage amplitude of the bus 5 in the post-contingency state of the "contingency 5" is out of a lower limit by $\underline{\delta}_{V_5,5}^{(0)} = \underline{V}^C - V_{5,5}^{(0)} = 0.0287$, a voltage amplitude of the bus 7 in the post-contingency state of the "contingency 1" is out of an upper limit by $\overline{\delta}_{V_7,1}^{(0)} = V_{7,1}^{(0)} - \overline{V}^C = 0.0011$, and the voltage amplitude of any other bus does not have a violation. Therefore, the "contingency 5" causes a maximum violation to appear in the voltage amplitude of the bus 5, and the "contingency 1" causes a maximum violation to appear in the voltage amplitude of the bus 7. The "contingency 5" and the "contingency 1" compose the severe contingency set $C_{Severity}$ of the single automatic voltage control calculation: $C_{Severity} = \{\text{contingency 1, contingency 5}\}$. Since each contingency causes one violation of the voltage amplitudes of the buses respectively, the severity indexes are $n_1 = 1$, $n_5 = 1$. A Single-time SCST identified by a time mark "51-8:30" of the current control snapshot is saved in the historical severe contingency information database, as shown in Table 4.

TABLE 4

Single-time SCST identified by time mark "51-8:30"
51-8:30

| severe contingency | $n_k$ |
|---|---|
| contingency 1 | 1 |
| contingency 5 | 1 |

Meanwhile, the Periodical SCST in the period of time "8:00-9:00" in which the time mark "51-8:30" of the current control snapshot is contained is updated. The severity index $n_{k,p} = 50$ of the "contingency 1" is updated as $n_{k,p} = 51$, and the severity index $n_{k,p} = 50$ of the "contingency 5" is updated as $n_{k,p} = 51$. The updated Periodical SCST in this period of time is thus obtained and saved in the historical severe contingency information database, as shown in Table 5.

TABLE 5

Periodical SCST in period of time "8:00-9:00"
8:00-9:00

| severe contingency | $n_{k,p}$ |
|---|---|
| contingency 1 | 51 |
| contingency 5 | 51 |
| contingency 2 | 2 |

The automatic voltage control calculation for the current control snapshot terminates now.

If a conventional static security constrained automatic voltage control method is adopted in the above embodiment, because of a strict post-contingency security constraint, there is no feasible solution for the security constrained optimal power flow model, and thus a usable automatic voltage control instruction may not be obtained. However, with the static security constrained automatic voltage control method according to embodiments of the present disclosure, a usable automatic voltage control instruction with the balance between economy and security is obtained, and the active power transmission losses of the power system and the maximum violation of the voltage amplitude in post-contingency states before and after the automatic voltage control calculation are listed in Table 6.

TABLE 6

Active power transmission losses of power system and maximum violation of voltage amplitude in post-contingency states before and after automatic voltage control calculation

|  | before calculation | after calculation |
|---|---|---|
| active power transmission loss | 3.1185 | 3.0327 |
| maximum violation of voltage amplitude in post-contingency states | 0.0548 | 0.0309 |

It may be known from Table 6 that, when an automatic voltage control instruction does not exist which enables a violation of a voltage amplitude of a bus not to appear in the power system in all post-contingency states scrutinized by the contingency assessment, the automatic voltage control instruction with a balance between the economy and the security may be obtained according to the method of the present disclosure. Both the active power transmission loss of the power system and the maximum violation of the voltage amplitude in post-contingency states are significantly reduced, which enables the economy and security of the power system significantly improved.

Reference throughout this specification to "an embodiment," "some embodiments," "one embodiment", "another example," "an example," "a specific example," or "some examples," means that a particular feature, structure, material, or characteristic described in connection with the embodiment or example is contained in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments may not be construed to limit the present disclosure, and changes, alternatives, and modifications may be made in the embodiments without departing from spirit, principles and scope of the present disclosure.

What is claimed is:

1. A static security constrained automatic voltage control method, comprising:
   performing a single automatic voltage control calculation for a control snapshot of a power system at a beginning of a control cycle in each control cycle according to a requirement of a power grid operation for an automatic voltage control when on-line conducting at a power grid control center,
   wherein the single automatic voltage control calculation comprises steps of:
   (1') obtaining a single-time severe contingency sequencing table and a periodical severe contingency sequencing table from a historical severe contingency information database, and selecting severe contingencies from a contingency set $C_{All}$ according to the single-time severe contingency sequencing table and the periodical severe contingency sequencing table to compose an active contingency set $C_{Active}$ of the single automatic voltage control calculation;
   (2') solving a trial solution of an optimal power flow model, using the trial solution of the optimal power flow model as a base state of the power system, and performing an iteration between a first result of the contingency assessment for the active contingency set $C_{Active}$ and the trial solution of the optimal power flow model to solve and obtain a single automatic voltage instruction; and
   (3') performing a contingency assessment for the contingency set $C_{All}$ using the trial solution of the optimal power flow model as the base state of the power system to obtain a second result of the contingency assessment, and updating the single-time severe contingency sequencing table and the periodical severe contingency sequencing table according to the second result of the contingency assessment, in which the updated severe contingency sequencing table is to be used in a next single automatic voltage control calculation.

2. The static security constrained automatic voltage control method according to claim 1, wherein:
   (1) the step of obtaining comprises obtaining by a calculating unit the single-time severe contingency sequencing table and the periodical severe contingency sequencing table from the historical severe contingency information database, which is stored in a computer-readable medium, and selecting by the calculating unit the severe contingencies from the contingency set $C_{All}$ according to the single-time severe contingency sequencing table and the periodical severe contingency sequencing table to compose the active contingency set $C_{Active}$ of the single automatic voltage control calculation stored in the computer-readable medium;
   (2) the step of solving comprises solving by the calculating unit the trial solution of the optimal power flow model, using by the calculating unit the trial solution of the optimal power flow model as the base state of the power system, and performing by the calculating unit the iteration between the first result of the contingency assessment for the active contingency set $C_{Active}$ and the trial solution of the optimal power flow model to solve and obtain the single automatic voltage instruction, which is stored in the computer-readable medium; and
   (3) the step of performing comprises performing by the calculating unit the contingency assessment for the contingency set $C_{All}$ using the trial solution of the optimal power flow model as the base state of the power system to obtain the second result of the contingency assessment, and updating by the calculating unit the single-time severe contingency sequencing table and the periodical severe contingency sequencing table according to the second result of the contingency assessment, in which the updated severe contingency sequencing table is to be used in the next single automatic voltage control calculation.

3. The static security constrained automatic voltage control method according to claim 2, wherein step (1) further comprises steps of:
- (1-1) obtaining by a calculating unit a single-time severe contingency sequencing table identified by a time mark T' of a control snapshot of a previous single automatic voltage control calculation from the historical severe contingency information database in a sequence of severity;
- (1-2) obtaining by the calculating unit a periodical severe contingency sequencing table in a period of time p in which a time mark T of a current control snapshot is contained from the historical severe contingency information database in a sequence of severity; and
- (1-3) selecting by the calculating unit $N_{Active}$ severest contingencies from the single-time severe contingency sequencing table and the periodical severe contingency sequencing table in a sequence of severity from high to low to compose the active contingency set $C_{Active}$ of the single automatic voltage control calculation, where $N_{Active}$ is a predetermined number of the contingencies contained in the active contingency set $C_{Active}$ and is calculated by rounding upward to a nearest integer of an average of a number of the severe contingencies contained in the single-time severe contingency sequencing tables obtained from all previous automatic voltage control calculations.

4. The static security constrained automatic voltage control method according to claim 2, wherein step (2) further comprises steps of:
- (2-1) solving by the calculating unit the optimal power flow model (1) to obtain a trial solution $(u_0^{(0)}, x_0^{(0)})$ of the optimal power flow model $$\min f(x_0, u_0) \quad (1)$$
$$s.t. \quad g_0(x_0, u_0) = 0$$
$$\underline{u}^{(0)} \leq u_0 \leq \overline{u}^{(0)}$$
$$\underline{x}^{(0)} \leq x_0 \leq \overline{x}^{(0)}$$

where $u_0$ is a control variable vector, $x_0$ is a state variable vector, an object function $f(x_0, u_0)$ is an active power transmission loss of the power system, a constraint equation $g_0(x_0, u_0)=0$ is a power flow equation of the power system in the pre-contingency state, $\underline{u}$ is a lower limit of the control variable vector, $\overline{u}$ is an upper limit of the control variable vector, $\underline{x}$ is a lower limit of the state variable vector in the pre-contingency state, $\overline{x}$ is an upper limit of the state variable vector in the pre-contingency state, $\underline{u}^{(0)}=\underline{u}$, $\overline{u}^{(0)}=\overline{u}$, $\underline{x}^{(0)}=\underline{x}$, and $\overline{x}^{(0)}=\overline{x}$;
- (2-2) performing by the calculating unit the contingency assessment for the active contingency set $C_{Active}$ using the trial solution $(u_0^{(0)}, x_0^{(0)})$ of the optimal power flow model as a base state of the power system to obtain a first result of the contingency assessment, and performing by the calculating unit an iteration between the first result of the contingency assessment and a solution of the optimal power flow model to solve and obtain the single automatic voltage control instruction; and
- (2-3) performing by the calculating unit an automatic voltage control for the power system in the control cycle according to the single automatic voltage control instruction.

5. The static security constrained automatic voltage control method according to claim 4, wherein step (3) further comprises steps of:
- (3-1) performing by the calculating unit the contingency assessment for the contingency set $C_{All}$ using the trial solution $(u_0^{(0)}, x_0^{(0)})$ of the optimal power flow model as a base state of the power system, and if an $i^{th}$ variable $x_i$ in a state variable vector x is a security monitor variable, calculating by the calculating unit a high violation $\overline{\delta}_{i,k}$ and a low violation $\underline{\delta}_{i,k}$ of an $i^{th}$ element $x_{i,k}$ in a state variable vector $x_k$ in a post-contingency state of contingency k by a formula (2):

$$\overline{\delta}_{i,k} = \begin{cases} x_{i,k} - \overline{x}_i^C & (x_{i,k} > \overline{x}_i^C) \\ 0 & (x_{i,k} \leq \overline{x}_i^C) \end{cases} \quad (2)$$

$$\underline{\delta}_{i,k} = \begin{cases} \underline{x}_i^C - x_{i,k} & (x_{i,k} < \underline{x}_i^C) \\ 0 & (x_{i,k} \geq \underline{x}_i^C) \end{cases}$$

where $k=1, \ldots, N_c$, $i=1, \ldots N_x$, and $x_i$ is a security monitor variable;
- (3-2) selecting by the calculating unit a contingency which causes a maximum high violation or a maximum low violation to appear in any security monitor variable to compose a severe contingency set $C_{Severity}$:

$$C_{Severity} = \{\text{a contingency } m \mid \exists\, i, 1 \leq i \leq N_x,$$
$$i \in N_+, x_i \text{ is a security monitor vatiable } s.t.\ \overline{\delta}_{i,m} =$$
$$\max_k \overline{\delta}_{i,k} \text{ or } \underline{\delta}_{i,m} = \max_k \underline{\delta}_{i,k}\};$$

- (3-3) if the maximum high violations appear in $n_{k,U}$ security monitor variables and the maximum low violations appear in $n_{k,L}$ security monitor variables in the post-contingency state of the contingency k, recording by the calculating unit a severity index of the contingency k as $n_k = n_{k,L} + n_{k,U}$; sequencing by the calculating unit the contingencies in the severe contingency set $C_{Severity}$ according to the severity indexes of the contingencies, and saving by the calculating unit the contingencies in $C_{Severity}$ into a single-time severe contingency sequencing table with a time mark T in the historical severe contingency information database; and
- (3-4) updating by the calculating unit the periodical severe contingency sequencing table in the historical severe contingency information database in the period of time p in which the time mark T of the control snapshot of the single automatic voltage control calculation is contained.

6. The static security constrained automatic voltage control method according to claim 5, wherein step (3-4) further comprises steps of:
- (3-4-1) picking by the calculating unit the severity index of each contingency in the periodical severe contingency sequencing table in the period of time p in which a time mark T of a current control snapshot is contained, and for $\forall$ contingency $k \in C_{Severity}$, updating by the calculating unit the severity index as $n_{k,p}' = n_{k,p} + 1$, where the severity index $n_{k,p}$ is times for which the contingency k is the severe contingency in the period of time p in history; and
- (3-4-2) sequencing by the calculating unit the severe contingencies according to the updated severity index so as to update the periodical severe contingency sequencing table in the period of time p, and saving by the calculating unit the updated periodical severe contingency sequencing table in the historical severe contingency information database.

7. The static security constrained automatic voltage control method according to claim 4, wherein step (2-2) further comprises steps of:
  (2-2-1) making t=0, where t is an iterative sequence number, and t∈N$_+$;
  (2-2-2) performing by the calculating unit a contingency assessment for the active contingency set C$_{Active}$ using a solution (u$_0^{(t)}$,x$_0^{(t)}$) as a base state of the power system to obtain a first result of the contingency assessment; and if the security monitor variables in the first result of the contingency assessment do not have a violation or have a violation less than a maximum violation allowable by an operation of the power system, going to step (2-2-7), or else, going to step (2-2-3);
  (2-2-3) adjusting by the calculating unit security limits of variables $\underline{u}^{(t+1)}$, $\overline{u}^{(t+1)}$, $\underline{x}^{(t+1)}$, $\overline{x}^{(t+1)}$ according to the first result of the contingency assessment;
  (2-2-4) making t=t+1;
  (2-2-5) solving by the calculating unit an optimal power flow model (3) established by adopting the adjusted security limits:

$$\min f(x_0, u_0) \quad (3)$$
$$s.t. \quad g_0(x_0, u_0) = 0$$
$$\underline{u}^{(t)} \le u_0 \le \overline{u}^{(t)}$$
$$\underline{x}^{(t)} \le x_0 \le \overline{x}^{(t)};$$

(2-2-6) when t>0, if $|u_0^{(t)}-u_0^{(t-1)}| \le$ tol and $|x_0^{(t)}-x_0^{(t-1)}| \le$ tol, where tol is a convergence criterion, going to step (2-2-7), or else, going to step (2-2-2); and
  (2-2-7) obtaining by the calculating unit the solution (u$_0^{(t)}$, x$_0^{(t)}$) of the automatic voltage control calculation in the control cycle, and outputting by the calculating unit the single automatic voltage control instruction in the control cycle.

8. The static security constrained automatic voltage control method according to claim 7, wherein tol is within a range from $10^{-4}$ to $10^{-2}$.

9. The static security constrained automatic voltage control method according to claim 7, wherein step (2-2-3) further comprises:
  (2-2-31) if a variable x$_i$ is a security monitor variable, calculating by the calculating unit a high violation $\overline{\delta}_{i,k}$ and a low violation $\underline{\delta}_{i,k}$ of the variable x$_i$ in a post-contingency state of a contingency k in a t$^{th}$ time iteration by a formula (4):

$$\overline{\delta}_{i,k}^{(t)} = \begin{cases} x_{i,k}^{(t)} - \overline{x}_i^C & (x_{i,k}^{(t)} > \overline{x}_i^C) \\ 0 & (x_{i,k}^{(t)} \le \overline{x}_i^C) \end{cases} \quad (4)$$

$$\underline{\delta}_{i,k}^{(t)} = \begin{cases} \underline{x}_i^C - x_{i,k}^{(t)} & (x_{i,k}^{(t)} < \underline{x}_i^C) \\ 0 & (x_{i,k}^{(t)} \ge \underline{x}_i^C) \end{cases}$$

where k=1, . . . , N$_c$, i=1, . . . N$_x$, the contingency k∈C$_{Active}$, and x$_i$ is a security monitor variable;
  (2-2-32) defining $$\overline{\delta}_i^{(t)} = \max_k \{\overline{\delta}_{i,k}^{(t)}\} \quad (5)$$
$$\underline{\delta}_i^{(t)} = \max_k \{\underline{\delta}_{i,k}^{(t)}\};$$

(2-2-33) calculating by the calculating unit a lower limit $\underline{x}_i^{(t+1)}$ and an upper limit $\overline{x}_i^{(t+1)}$ of the security monitor variable x$_i$ used in a (t+1)$^{th}$ time iteration by a formula (6):

$$\underline{x}_i^{(t+1)} = \min\{\underline{x}_i^{(t)} + k_{min} \cdot \underline{\delta}_i^{(t)}, x_{i,base}, \overline{x}_i^{(t)} - \epsilon\}$$

$$\overline{x}_i^{(t+1)} = \max\{\overline{x}_i^{(t)} - k_{max} \cdot \overline{\delta}_i^{(t)}, x_{i,base}, \underline{x}_i^{(t+1)} + \epsilon\} \quad (6)$$

where k$_{min}$ is an adjusting coefficient of a lower limit of a variable, k$_{max}$ is an adjusting coefficient of an upper limit of the variable, x$_{i,base}$ is a value of the variable x$_i$ in a control snapshot before the automatic voltage control calculation, and $\epsilon$ is a minimum band width between the upper limit and the lower limit of the variable.

10. The static security constrained automatic voltage control method according to claim 9, wherein k$_{min}$ and k$_{max}$ range from 0.8 to 1.2, and $\epsilon$ is greater than 0.01 p.u.

11. The static security constrained automatic voltage control method according to claim 7, wherein step (2-2-5) further comprises:
  (2-2-51) solving by the calculating unit the optimal power flow model (3), and if there is a solution, going to step (2-2-53), or else, going to step (2-2-52);
  (2-2-52) reducing k$_{min}$ and k$_{max}$, recalculating the lower limit $\underline{x}_i^{(t+1)}$ and the upper limit $\overline{x}_i^{(t+1)}$ of the security monitor variable x$_i$ by the formula (6), and then going to step (2-2-51); and
  (2-2-53) obtaining by the calculating unit the solution (u$_0^{(t)}$,x$_0^{(t)}$).

12. The static security constrained automatic voltage control method according to claim 11, wherein k$_{min}$ and k$_{max}$ are reduced by 0.02, 0.05 or 0.1 each time.

\* \* \* \* \*

UNITED STATES PATENT AND TRADEMARK OFFICE
CERTIFICATE OF CORRECTION

| | | |
|---|---|---|
| PATENT NO. | : 9,164,499 B2 | Page 1 of 1 |
| APPLICATION NO. | : 13/914270 | |
| DATED | : October 20, 2015 | |
| INVENTOR(S) | : Sun et al. | |

It is certified that error appears in the above-identified patent and that said Letters Patent is hereby corrected as shown below:

In the claims

Claim 5, Column 20, line 32, delete "vatiable" and insert --variable--.

Signed and Sealed this
Twelfth Day of April, 2016

Michelle K. Lee
*Director of the United States Patent and Trademark Office*